United States Patent
Branecky

(10) Patent No.: US 10,584,874 B2
(45) Date of Patent: Mar. 10, 2020

(54) COMMON VENTING SYSTEM FOR WATER HEATERS AND METHOD OF CONTROLLING THE SAME

(71) Applicant: A. O. Smith Corporation, Milwaukee, WI (US)

(72) Inventor: Brian T. Branecky, Oconomowoc, WI (US)

(73) Assignee: A. O. SMITH CORPORATION, Milwaukee, WI (US)

(*) Notice: Subject to any disclaimer, the term of this patent is extended or adjusted under 35 U.S.C. 154(b) by 1073 days.

(21) Appl. No.: 13/680,907

(22) Filed: Nov. 19, 2012

(65) Prior Publication Data

US 2014/0137851 A1 May 22, 2014

(51) Int. Cl.
| | |
|---|---|
| F24D 3/00 | (2006.01) |
| F23J 11/02 | (2006.01) |
| F04D 15/00 | (2006.01) |
| F24D 19/10 | (2006.01) |
| F24D 12/02 | (2006.01) |

(52) U.S. Cl.
CPC ........... *F23J 11/02* (2013.01); *F04D 15/0066* (2013.01); *F24D 12/02* (2013.01); *F24D 19/1006* (2013.01); *F23N 2025/06* (2013.01); *F24D 2200/043* (2013.01); *Y02B 30/14* (2013.01)

(58) Field of Classification Search
CPC ....... F22B 35/00; F23N 2025/06; Y02B 30/10
USPC .......... 122/448.1–448.3; 413/12, 19
See application file for complete search history.

(56) References Cited

U.S. PATENT DOCUMENTS

| | | | |
|---|---|---|---|
| 2,731,974 | A | 1/1956 | Krueger, III |
| 4,343,194 | A | 8/1982 | Dehart et al. |
| 4,672,919 | A | 6/1987 | Staats |
| 4,768,444 | A | 9/1988 | DeWerth et al. |
| 5,159,218 | A | 10/1992 | Murry et al. |
| 5,222,888 | A | 6/1993 | Jones et al. |

(Continued)

FOREIGN PATENT DOCUMENTS

| | | |
|---|---|---|
| CN | 2415313 | 1/2001 |
| CN | 1293745 | 5/2001 |

(Continued)

OTHER PUBLICATIONS

European Patent Office Action for Application No. 13193049.7 dated Jan. 29, 2014 (3 pages).

(Continued)

*Primary Examiner* — Steven B McAllister
*Assistant Examiner* — Ko-Wei Lin
(74) *Attorney, Agent, or Firm* — Michael Best & Friedrich LLP

(57) ABSTRACT

A water heater venting system, the water heater venting system comprising a main exhaust vent; and a first water heater in communication with a second water heater. The first water heater including an inlet, a blower assembly including a motor, an exhaust vent coupled to the main exhaust vent, a fluid flowpath created by fluid communication between the inlet, the blower assembly, and the exhaust vent, a sensor positioned along the fluid flowpath, and a controller electrically coupled to the sensor and the motor of the blower assembly, the controller controlling the speed of the motor based on at least one of an input from the sensor and an input from the second water heater.

6 Claims, 7 Drawing Sheets

(56) References Cited

U.S. PATENT DOCUMENTS

| | | | | |
|---|---|---|---|---|
| 5,365,795 | A | * | 11/1994 | Brower, Jr. ............... 73/861.65 |
| 5,616,995 | A | | 4/1997 | Hollenbeck |
| 5,636,993 | A | | 6/1997 | Badry |
| 5,863,246 | A | * | 1/1999 | Bujak, Jr. ............. F24F 3/0442 165/212 |
| 6,216,685 | B1 | | 4/2001 | Payne |
| 6,428,282 | B1 | | 8/2002 | Langley |
| 6,824,362 | B2 | | 11/2004 | Dodson, III |
| 2007/0081888 | A1 | * | 4/2007 | Harrison ............... F04D 19/007 415/47 |
| 2009/0139348 | A1 | | 6/2009 | Speldrich |
| 2009/0241943 | A1 | | 10/2009 | Schwank et al. |
| 2009/0269713 | A1 | * | 10/2009 | Choi ........................ C21D 1/00 432/47 |
| 2010/0112500 | A1 | | 5/2010 | Maiello et al. |
| 2010/0330512 | A1 | * | 12/2010 | Kim ..................... F24H 9/2042 431/12 |
| 2012/0138149 | A1 | * | 6/2012 | Hatada ..................... F24H 1/10 137/1 |

FOREIGN PATENT DOCUMENTS

| | | | | |
|---|---|---|---|---|
| CN | 102072344 | | 5/2011 | |
| CN | 202066186 | | 12/2011 | |
| DE | 1778648 | | 8/1971 | |
| FR | 2687212 | | 8/1993 | |
| GB | 299090 | | 10/1928 | |
| GB | 2027851 | | 2/1980 | |
| GB | 2271443 | | 4/1994 | |
| JP | 2002013701 | | 1/2002 | |
| JP | 2002013701 A | * | 1/2002 | ............. F22B 35/00 |
| JP | 2009210183 | | 9/2009 | |
| JP | 2009250471 | | 10/2009 | |
| WO | 9742467 | | 11/1997 | |
| WO | 2009142377 | | 11/2009 | |

OTHER PUBLICATIONS

European Patent Office Action for Application No. 13193049.7 dated Jul. 17, 2014 (10 pages).
EP13193049.7 Extended European Search Report dated Jan. 26, 2016 (9 pages).
First Office Action from the State Intellectual Property Office of China for Application No. 201310581592.6 dated May 4, 2017 (17 pages).
Chinese Patent Office Action for Application No. 201310581592.6 dated Jan. 19, 2018 (17 pages, English translation included).
Chinese Patent Office Action for Application No. 201310581592.6 dated Apr. 2, 2019 (15 pages, English translation included).
Canadian Patent Office Action for Application No. 2,832,628 dated Jul. 22, 2019 (4 pages).
Chinese Patent Office Action for Application No. 201310581592.6 dated Aug. 15, 2019 (14 pages, statement of relevance included).

* cited by examiner

COMMON VENTING SYSTEM FOR WATER HEATERS AND METHOD OF CONTROLLING THE SAME

BACKGROUND

The invention relates to a vent system for multiple water heaters.

A growing number of commercial applications are installing multiple water heaters to meet the demand of their facilities. As a result, in order to save cost on venting, common vent solutions are used to connect water heaters together. In a common vent system, a firing water heater may cause the pressure in the common stack to go positive resulting in flue gasses travelling in the wrong direction of the non-firing, or idle, water heaters. Excess pressure drop may also affect water heater operation.

SUMMARY

The idle water heaters should maintain and control a slightly positive pressure within their respective exhaust vents to prevent the flue gasses from the firing water heater travelling in the wrong direction. The firing water heater or heaters will communicate with the idle water heaters when they are turning on. The idle water heaters will then control their blowers to maintain a slightly positive pressure within their exhaust vents.

In one embodiment, the invention provides a water heater venting system, the water heater venting system comprising a main exhaust vent; and a first water heater in communication with a second water heater. The first water heater including an inlet, a blower assembly including a motor, an exhaust vent coupled to the main exhaust vent, a fluid flowpath created by fluid communication between the inlet, the blower assembly, and the exhaust vent, a sensor positioned along the fluid flowpath, and a controller electrically coupled to the sensor and the motor of the blower assembly, the controller controlling the speed of the motor based on at least one of an input from the sensor and an input from the second water heater.

In another embodiment the invention provides a method of controlling a water heating system including a main exhaust vent, a first water heater, and a second water heater, the first water heater including a fluid flowpath, an exhaust vent coupled to the main exhaust vent, a sensor, and a blower assembly including a motor. The method comprising sensing a pressure difference using the sensor along the fluid flowpath, and varying the speed of the motor of the blower assembly of the second water heater in response to the sensed pressure difference and an input from the second water heater.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one implementation of a common vent system, the exhaust vents of a plurality of water heaters are connected to a main exhaust vent. When one or more of the water heaters begin operating, the water heater or heaters send a control signal to the non-operating, or idle, water heater(s). The idle water heaters then sense a pressure of their respective exhaust vents. The idle water heaters control their blowers, based on the sensed pressure, to maintain a slightly positive velocity within their respective exhaust vents (i.e., exhaust air flowing out of the exhaust vent). This slightly positive pressure prevents exhaust from the operating water heater or heaters to enter the idle water heaters through the exhaust outlets. Although discussed as being used in a commercial setting, it is also contemplated that the invention be used in a residential setting.

Figure 1:
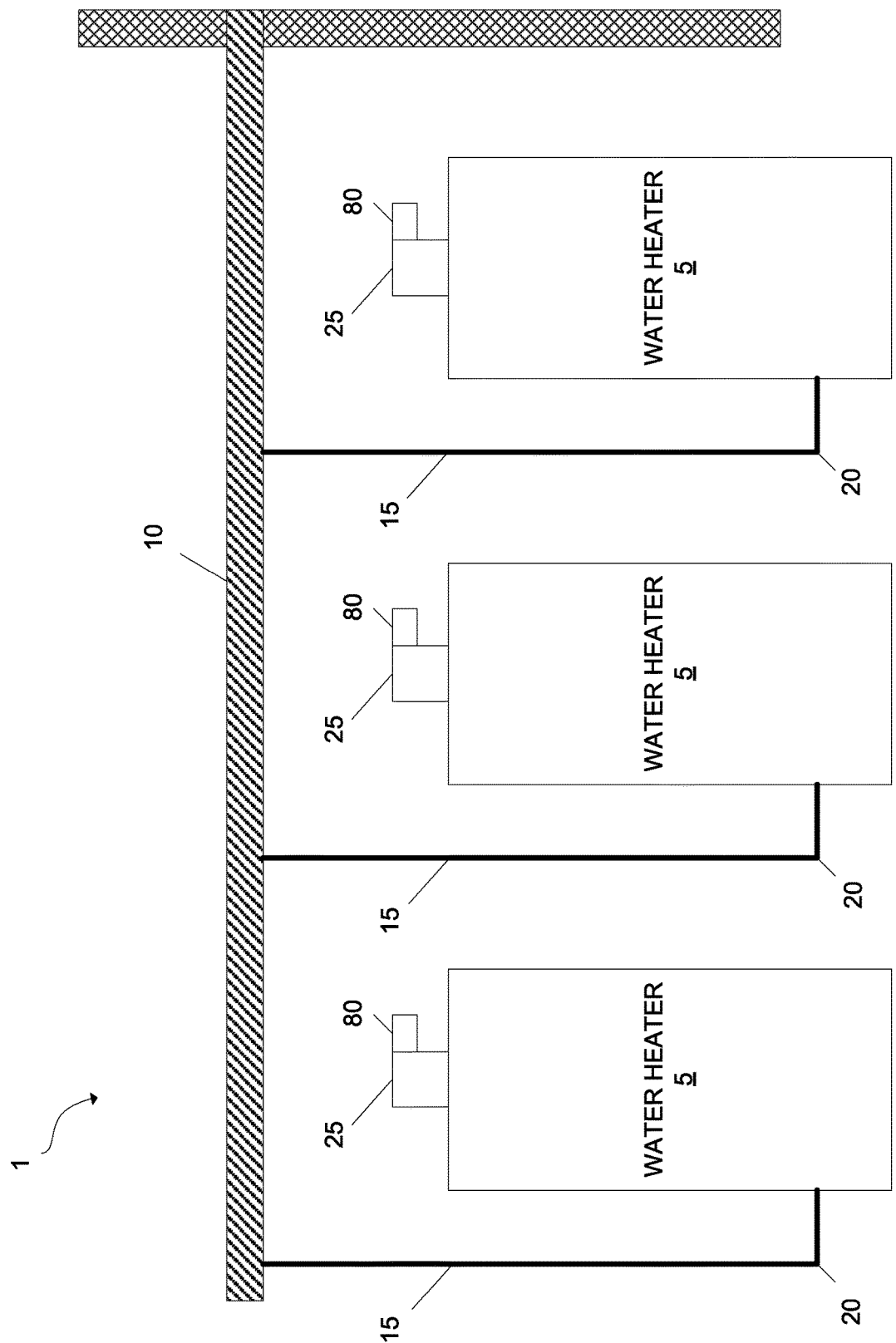
FIG. 1 is a block diagram showing a common vent system for a plurality of water heaters.

FIG. 1 is a block diagram showing a common vent system or vent system 1 for a plurality of water heaters 5. The vent system 1 includes a main exhaust vent 10, exhaust vents 15, and water heaters 5. The exhaust vents 15 include elbows 20. The water heaters 5 include a blower assembly 25, including an inlet 80.

Figure 2:
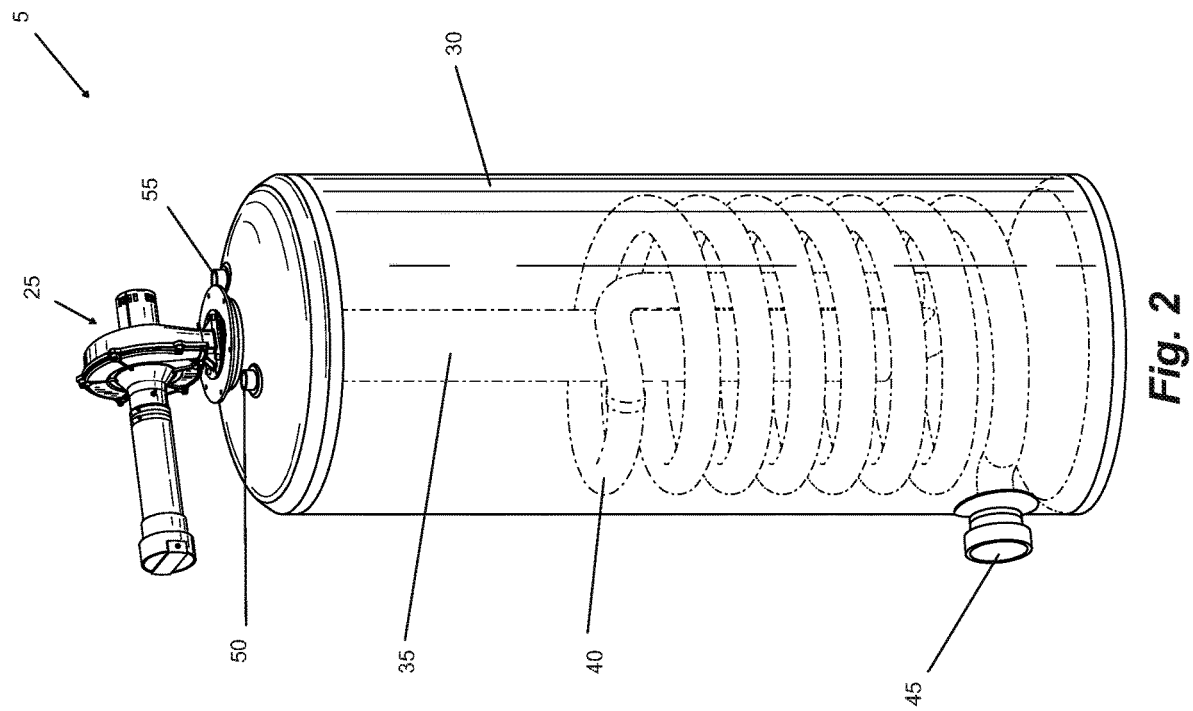
FIG. 2 is a perspective view of a water heater capable of being used in the common vent system of FIG. 1.

FIG. 2 illustrates a construction of a water heater 5 of the vent system 1. The water heater 5 includes the blower assembly 25, a water storage tank 30, a combustion chamber 35, a flue 40, an exhaust outlet 45, a cold water inlet 50, and a hot water outlet 55. A burner 60 (shown in FIG. 3) is positioned in the combustion chamber 35. The blower assembly 25 provides a combustible mixture to the burner 60 for combustion. The hot products of combustion flow from the combustion chamber 35, through the flue 40, and exit through the exhaust outlet 45 while heating the water stored in the water storage tank 30. The hot products of combustion flowing out of the water heater 5 through the exhaust outlet 45 are known as exhaust. The cold water inlet 50 supplies water to the water storage tank 30. The hot water outlet 55 supplies hot water to an end-use location, for example, a faucet. The tank 30 typically includes dip tubes coupled to the cold water inlet 50 and hot water outlet 55. In another embodiment the water heater 5 is an instantaneous water heater, which does not include a water storage tank. Although the water heaters 5 of the vent system 1 are discussed as being similar types of water heaters, several different types of water heaters can be used within the system (e.g., a tanked water heater in combination with an instantaneous water heater).

Figure 3:
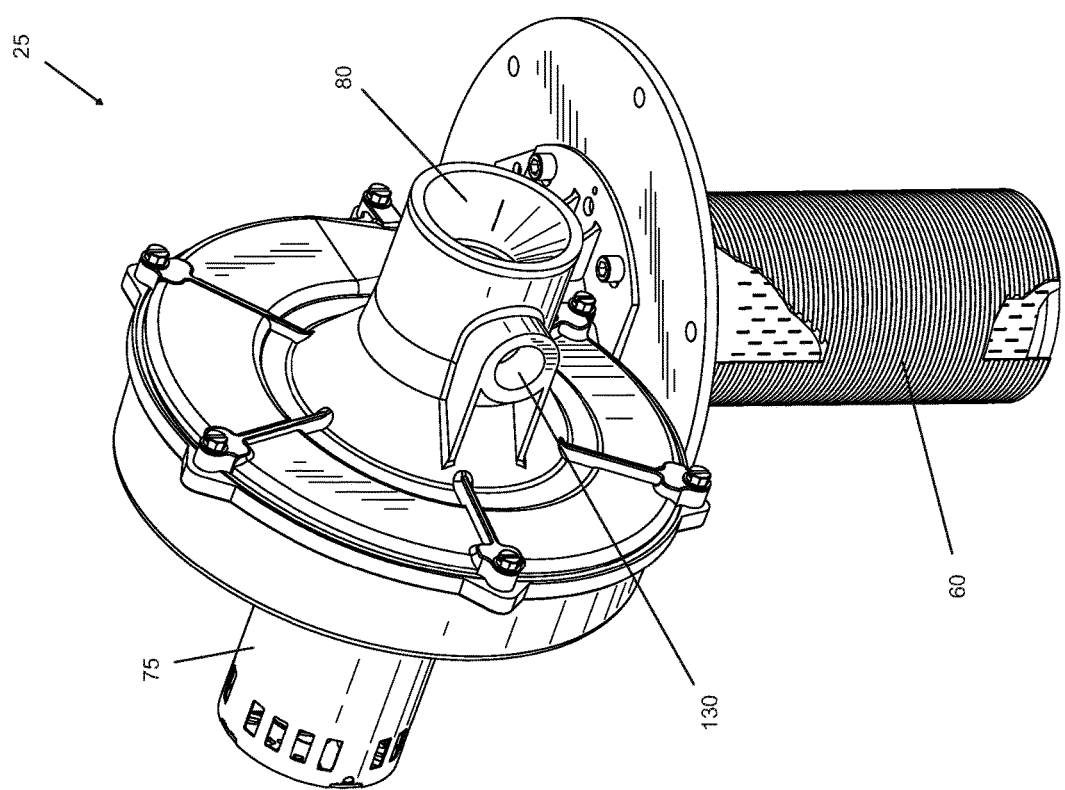
FIG. 3 is a perspective view of a blower assembly for the water heater of FIG. 2.
Figure 4:
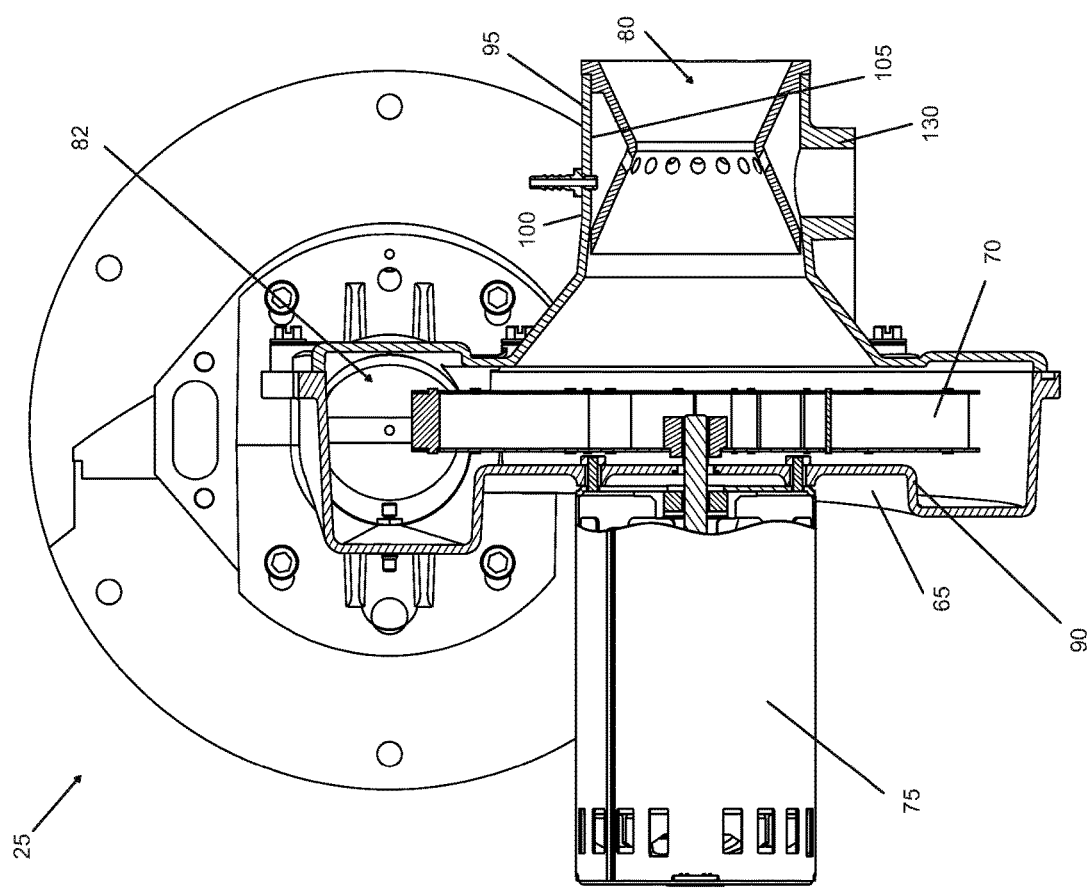
FIG. 4 is a sectional view of the blower assembly of FIG. 3.

FIG. 3-4 illustrates the blower assembly 25 and the burner 60. The blower assembly 25 includes a housing 65, a fan or impeller 70, a motor 75, the inlet 80, an outlet 82, and a control module 85 (described below). The housing 65 defines an interior space 90 in which the impeller 70 is supported for rotation. In one embodiment the inlet 80 includes an elbow similar to elbow 20 of the exhaust vent 15.

The motor 75 is operatively interconnected with the impeller 70 to drive rotation of the impeller 70 within the interior space 90. In some constructions, the motor 75 of the blower assembly 25 is a permanent magnet, brushless direct-current (BLDC) motor. As is commonly known, BLDC motors include a stator, a permanent magnet rotor, and an electronic commutator. The electronic commutator typically includes, among other things, a programmable device (a microcontroller, a digital signal processor, or a similar controller) having a processor and memory. The programmable device of the BLDC motor uses software stored in the memory to control the electronic commutator. The electronic commutator then provides the appropriate electrical energy to the stator in order to rotate the permanent-magnet rotor at a desired speed. In various constructions, the motor 75 can be a multi-speed motor, or a variable-speed motor. Also, the motor 75 can be a direct-current motor or an alternating-current motor.

The inlet 80 includes an inlet wall 95 having an outer surface 100 and an inner surface 105. A gas supply port 130 extends through the inlet wall 95. The gas supply port 130 communicates with a gas supply valve. The burner 60 is connected to the outlet 82.

In use, the motor 75 rotates the impeller 70, which draws air in through the inlet 80. Gaseous fuel is supplied via the gas supply port 130. The gaseous fuel is a combustible gas, for example, natural gas or propane. The gaseous fuel mixes with the combustion air to create a combustible mixture. The combustible mixture is then supplied to the burner 60 for combustion.

Upon exiting the exhaust outlets 45, the exhaust from the water heaters 5 travel through the respective exhaust vents 15 of the water heaters 5, including the elbows 20 of the exhaust vents 15. The exhaust from the water heaters 5 then exits through the main exhaust vents 10, which is shared by all the water heaters 5 of the common vent system 1.

The inlet 80, blower assembly 25, combustion chamber 35, flue 40, exhaust outlet 45, and exhaust vents 15 are in fluid communication. The inlet 80, blower assembly 25, combustion chamber 35, flue 40, exhaust outlet 45, and exhaust vents 15 form a fluid flowpath through the water heater 5.

Figure 5:
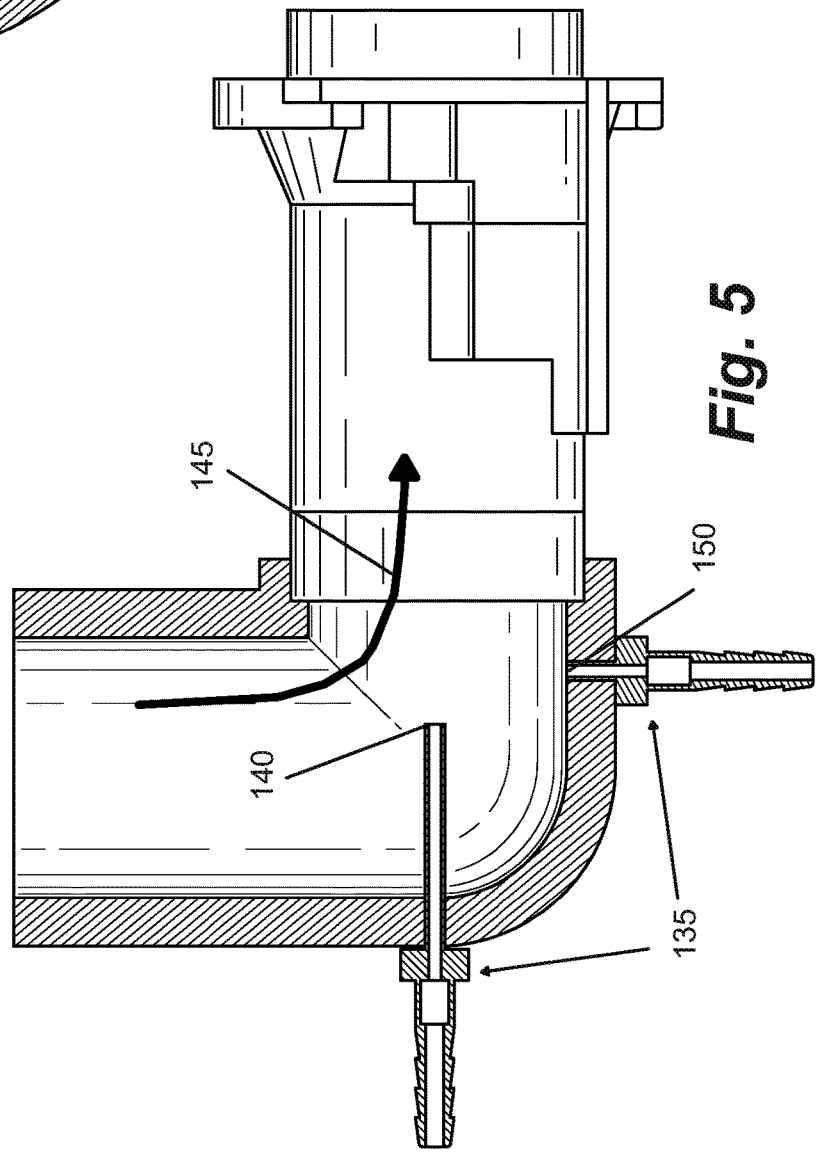
FIG. 5 is a sectional view of an elbow of the common vent system of FIG. 1.

FIG. 5 is a sectional view of a construction of a pitot tube 135, or similar air flow sensor. The pitot tube 135 can be placed within the elbow 20 or within an elbow at the inlet 80. The pitot tube 135 is a pressure measurement instrument used to measure fluid flow velocity. The pitot tube 135 measures the fluid flow velocity at the elbow 20 of an exhaust vent 15, or at the elbow of the inlet 80. The pitot tube 135 is placed within the elbow 20 or inlet 80 so that the pitot tube 135 is collinear with the center line of the elbow 20 or inlet 80. The pitot tube 135 includes a dynamic passageway 140. The dynamic passageway 140 is perpendicular to the direction of airflow 145. The pitot tube 135 also includes a static passageway 150. The static passageway 150 is parallel to the airflow 145, where the pressure remains static. As the air flows through the exhaust vent, the air flows past the dynamic passageway 140. Sensors 155 (shown in FIG. 7) measure the pressure of the fluid as it flows past the dynamic passageway 140 and the static passageway 150. The two pressure measurements are then received by the control module 85, which uses the difference of the two pressure measurements to calculate a velocity of the fluid flow through the elbow 20 of the exhaust vent 10 or through the inlet 80. In the embodiment shown in FIG. 5 the pitot tube 135 is placed within an elbow, either elbow 20 or an elbow at the inlet 80. The pitot tube 135 being placed within an elbow provides a more accurate pressure measurement than if placed in a straight portion of the fluid flowpath.

Figure 6:
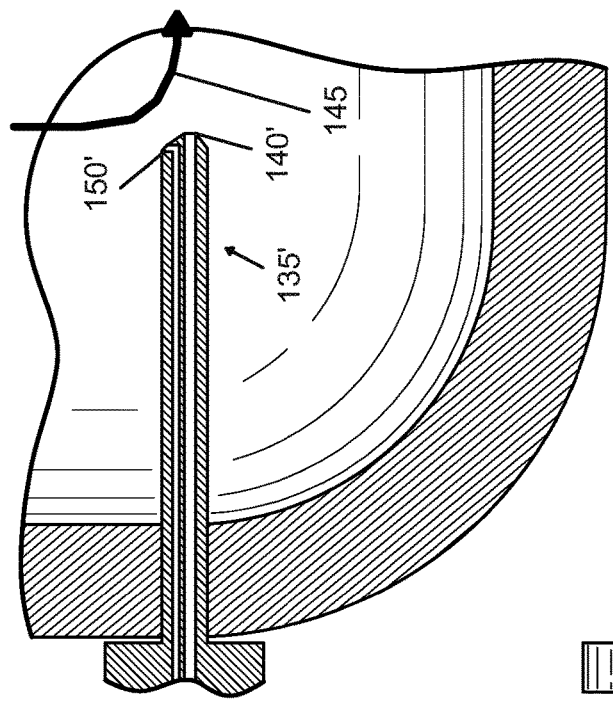
FIG. 6 is an enlarged sectional view of a construction of a pitot tube located in an elbow of the common vent system of FIG. 1.

FIG. 6 shows a sectional view of another construction of the pitot tube 135'. The pitot tube 135' includes a dynamic passageway 140' and a static passageway 150'. The opening of the dynamic passageway 140' is parallel with the direction of the airflow 145, while the opening of the static passageway 150' is perpendicular to the airflow 145. Sensors 155 measure the difference in pressure between the pressure of the air flowing past the dynamic passageway 140', and the static pressure at the static passageway 150'. The difference of the two pressure measurements is then received by the control module 85, which calculates the velocity of the airflow through the elbow 20 or at the inlet 80.

Although the pitot tube 135 is shown as being placed within the elbow 20 or within an elbow at the inlet 80 in the constructions shown in FIGS. 5 and 6, in other constructions, the pitot tube 135 is placed at other location within the exhaust vent 15 or along the flowpath of the water heater 5. Further, in other embodiments other air flow or pressure sensors may be used.

Before proceeding further, it should be understood that while the control module 85 is discussed herein as a module, and specifically a user-interface module, the control module can comprise multiple modules.

Figure 7:
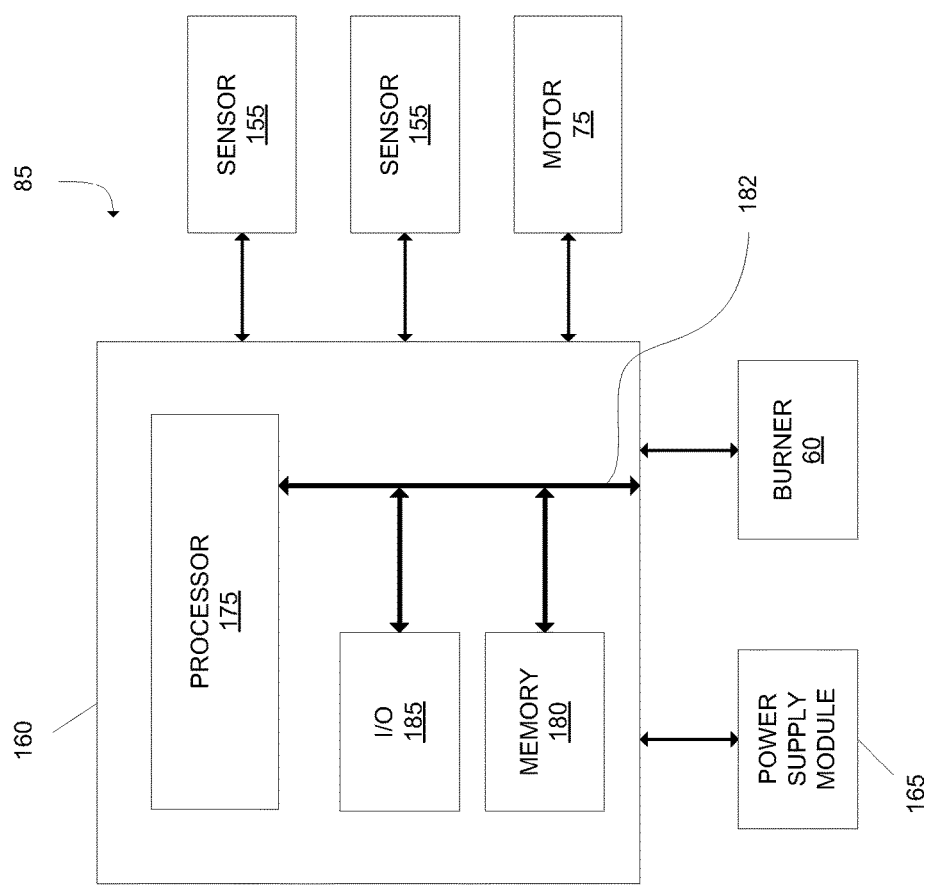
FIG. 7 is a block diagram of a controller of capable of being used in the water heater of FIG. 2.

FIG. 7 is a block diagram of the control module 85 including, among other things, a controller 160 and a power supply module 165. The controller 160 includes combinations of software and hardware that are operable to, among other things, control the operation of the blower assembly 25. In one construction, the controller 160 includes a printed circuit board ("PCB") that is populated with a plurality of electrical and electronic components that provide power, operational control, and protection to the control module 85. In some constructions, the PCB includes, for example, a processor or processing unit 175 (e.g., a microprocessor, a microcontroller, or another suitable programmable device), a memory 180, and a bus 182. The bus 182 connects various components of the PCB including the memory 180 to the processing unit 175. The memory 180 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 175 is connected to the memory 180 and executes software that is capable of being stored in the RAM (e.g., during execution), the ROM (e.g., on a generally permanent basis), or another non-transitory computer readable medium such as another memory or a disc. Additionally or alternatively, the memory 180 is included in the processing unit 175. The controller 160 also includes an input/output ("I/O") system 185 that includes routines for transferring information between components within the controller 160 and other components of the control module 85. For example, the I/O system 185 is configured to provide communication between the control module 85 and the sensors 155, the motor 75, and the burner 60. The I/O system 185 is further configured to provide communication between the control modules 85 of the multiple water heaters 5.

Software included in the implementation of the control module 85 is stored in the memory 180 of the controller 160.

The software includes, for example, firmware, one or more applications, program data, one or more program modules, and other executable instructions. The controller 160 is configured to retrieve from memory and execute, among other things, instructions related to the control processes and methods described below. For example, the controller 160 is configured to execute instructions retrieved from the memory 180 for monitoring the pressures sensed by the sensors 155 and controlling the motor 75 of the blower assembly 25. In other constructions, the controller 160 or external device includes additional, fewer, or different components. Also, in other constructions, the sensors 155 sense other parameters, such as temperature.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 160.

The power supply module 165 supplies a nominal AC or DC voltage to the controller 160 or other components or modules of the water heater 5. The power supply module 165 is powered by, for example, a power source having nominal line voltages between 100V and 240V AC and frequencies approximately 50-60 Hz. The power supply module 165 is also configured to supply lower voltages to operate circuits and components within the controller 160 or water heater 5. In other constructions, the controller 160 or other components and modules within the water heater 5 are powered by one or more batteries or battery packs, or another grid-independent power source (e.g., a generator, a solar panel, etc.).

In the construction described above, each water heater 5 includes a control module 85, and each control module 85 is in communication with each other. Another construction includes a master control module, which is in communication with and controls all the control modules 85 of the water heaters 5. Another construction includes each individual water heater 5 having a control module 85, however, once a water heater 5 begins firing, the control module 85 of the firing water heater 5 assumes master operations and communicates with and controls the other control modules 85 of the other water heaters 5.

Figure 8:
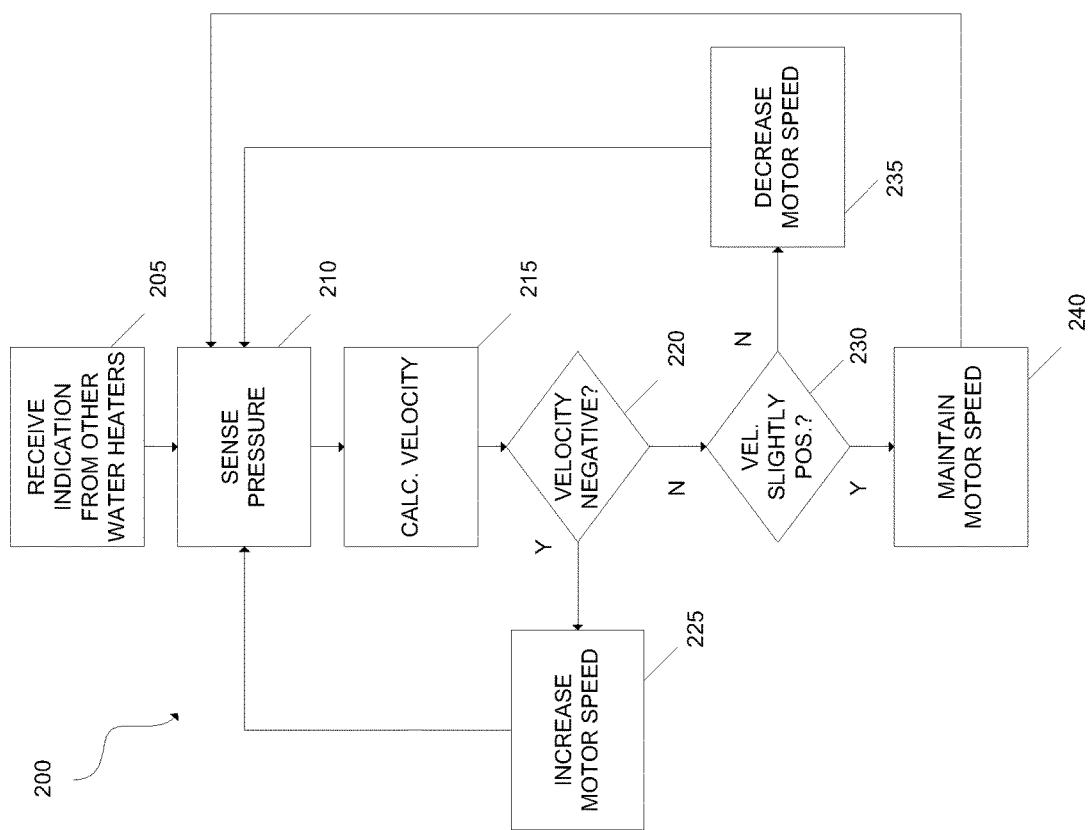
FIG. 8 illustrates a process for controlling the speed of the blower assembly of FIG. 4.

FIG. 8 is a process 200 for controlling the speed of the blower assembly 25 while the water heater 5 is not operating in heating mode. When the water heater 5 is operating in heating mode process 200 will not be performed, rather normal heating mode operations of the water heater 5 will continue to be performed. If at anytime during operation of process 200 the water heater 5 begins operating in heating mode, the process 200 will be stopped and normal heating mode operations will be performed. Although the process 200 is shown as a linear process, the order of the steps may be performed in a different process order, or may be performed simultaneously. A control module 85 receives an indication that one or more water heaters 5 of the system are turning on (Step 205). The pressures of the fluid flow on the dynamic passageway 140 and the static passageway 150 of the pitot tube 20 is sensed (Step 210). The control module 85 compares the two pressure measurements and calculates a fluid flow velocity of the exhaust vent 15 or inlet 80 (Step 215). The control module 85 determines if the velocity is negative (i.e., flowing into the water heater through the exhaust outlet 45 or flowing out of the inlet 80) (Step 220).

If the velocity is negative, the control module 85 increases the speed of the motor 75 of the blower assembly 25, increasing the velocity of the fluid flow through the flowpath (Step 225). If the velocity is zero or positive, the control module 85 determines if the velocity is within a range which significantly reduces backflow into the water heater 5, but does not contribute to backflow into other water heaters 5 of the vent system 1 (Step 230). This velocity range is called "slightly non-negative." In one embodiment slightly non-negative is approximately 0-5 CMF (cubic feet per minute). In another embodiment slightly non-negative is approximately 0-10 CMF. In another embodiment slightly non-negative is approximately 0-20 CMF. If the velocity is not within the slightly non-negative range, the control module decreases the speed of the motor 75 of the blower assembly 25, decreasing the velocity of the fluid flow through the flowpath (Step 235). If the velocity is within the slightly non-negative range, the control module 85 maintains the speed of the motor 75, and thus maintains the velocity of the fluid flow through the flowpath (Step 240). The control module then cycles back to Step 210.

Thus, the invention provides, among other things, a new and useful common venting control for multiple water heaters. Various features and advantages of the invention are set forth in the following claims.

What is claimed is:

1. A water heater control system for a first water heater having a first exhaust vent and a second water heater having a second exhaust vent, the control system comprising:
   a first inlet;
   a second inlet;
   a first blower assembly including a first motor;
   a second blower assembly including a second motor;
   a first fluid flow path among the first inlet, the first blower assembly, and the first exhaust vent;
   a second fluid flow path among the second inlet, the second blower assembly, and the second exhaust vent;
   a first sensor positioned along the first fluid flow path;
   a second sensor positioned along the second fluid flow path;
   a first controller, including a first processor and a first memory, the first controller electrically coupled to the first sensor and the first motor of the first blower assembly, the first controller controlling the first motor based on a first electronic input from the first sensor and a second electronic signal from the second water heater; and
   a second controller, including a second processor and a second memory, electrically coupled to the second sensor and the second motor of the second blower assembly, the second controller controlling the second motor based on a second electronic input from the second sensor and a first electronic signal from the first water heater.

2. The water heater control system of claim 1, wherein the first sensor includes a pitot tube.

3. The water heater control system of claim 1, wherein the first sensor is positioned in an elbow of the first exhaust vent.

4. The water heater control system of claim 1, wherein the first sensor senses a pressure difference.

5. The water heater control system of claim 4, wherein the first controller calculates a fluid flow velocity based on the sensed pressure difference.

6. The water heater control system of claim 1, wherein the first motor is controlled to maintain an output air flow velocity in a slightly non-negative range.

\* \* \* \* \*